US012756296B2

(12) United States Patent
Itoh et al.

(10) Patent No.: US 12,756,296 B2
(45) Date of Patent: Oct. 6, 2026

(54) POWER CONVERSION DEVICE

(71) Applicant: Mitsubishi Electric Corporation, Tokyo (JP)

(72) Inventors: Yuki Itoh, Tokyo (JP); Yasushige Mukunoki, Tokyo (JP); Chihiro Kawahara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 154 days.

(21) Appl. No.: 18/843,803

(22) PCT Filed: Mar. 9, 2022

(86) PCT No.: PCT/JP2022/010285
§ 371 (c)(1),
(2) Date: Sep. 4, 2024

(87) PCT Pub. No.: WO2023/170817
PCT Pub. Date: Sep. 14, 2023

(65) Prior Publication Data
US 2025/0183788 A1 Jun. 5, 2025

(51) Int. Cl.
*H02M 7/487* (2007.01)
*B64D 47/00* (2006.01)
*H02M 1/32* (2007.01)

(52) U.S. Cl.
CPC ............ *H02M 1/325* (2021.05); *B64D 47/00* (2013.01); *H02M 7/487* (2013.01); *B64D 2221/00* (2013.01)

(58) Field of Classification Search
CPC ...... H02M 1/325; H02M 7/487; B64D 47/00; B64D 2221/00
See application file for complete search history.

(56) References Cited

U.S. PATENT DOCUMENTS

2008/0217649 A1* 9/2008 Arai ..................... H10D 64/513 363/135
2020/0204082 A1 6/2020 Yamaguchi
2021/0119442 A1 4/2021 Pettersson et al.

FOREIGN PATENT DOCUMENTS

EP 3291435 A1 * 3/2018 ............ H02M 7/487
JP 2006-042427 A 2/2006
(Continued)

OTHER PUBLICATIONS

Extended European Search Report issued Feb. 20, 2025 in European Patent Application No. 229308002, 11 pages.
(Continued)

*Primary Examiner* — Adolf D Berhane
(74) *Attorney, Agent, or Firm* — XSENSUS LLP

(57) ABSTRACT

First and second semiconductor elements are connected in series between a DC positive bus and a DC neutral point bus. Third and fourth semiconductor elements are connected in series between the DC neutral point bus and a DC negative bus. Fifth and sixth semiconductor elements are connected in series between a connection point of the first and second semiconductor elements and a connection point of the third and fourth semiconductor elements. Each semiconductor element includes at least one semiconductor switching element and at least one diode. A breakdown resistance of the first and fourth semiconductor elements to cosmic rays is higher than a breakdown resistance of the second and third semiconductor elements to cosmic rays. A breakdown resistance of the fifth and sixth semiconductor elements is higher than the breakdown resistance of the first and fourth semiconductor elements.

12 Claims, 12 Drawing Sheets

(56) References Cited

FOREIGN PATENT DOCUMENTS

| | | | |
|---|---|---|---|
| JP | 2015-089185 | A | 5/2015 |
| JP | 2021-061692 | A | 4/2021 |
| WO | 2019/043886 | A1 | 3/2019 |

OTHER PUBLICATIONS

Yongtao Cao, et al., "Comparison and Analysis of Muiti-State Reliability of Fault-Tolerant Inverter Topologies for the Electric Aircraft Propulsion System", 2021 24th international Conference on Electrical Machines and Systems (ICEMS), Oct. 31, 2021, 6 pages, XP034050366.

Jonas E. Huber, et al., "Optimum Number of Cascaded Cells for High-Power Medium-Voltage AC-DC Converters", IEEE Journal of Emerging and Selected Topics in Power Electronics, vol. 5, No. 1, Mar. 1, 2017, 20 pages, XP011640085.

International Search Report and Written Opinion mailed on May 24, 2022, received for PCT Application PCT/JP2022/010285, filed on Mar. 9, 2022, 08 pages including English Translation.

* cited by examiner

POWER CONVERSION DEVICE

CROSS-REFERENCE TO RELATED APPLICATION

This application is a national stage application, pursuant to 35 U.S.C. § 371, of International Patent Application No. PCT/JP2022/010285, filed Mar. 9, 2022, the entire contents of which is incorporated herein by reference.

TECHNICAL FIELD

The present disclosure relates to a power conversion device.

BACKGROUND ART

Japanese Patent Laying-Open No. 2021-61692 (PTL 1) discloses a power conversion device that outputs power at three levels of potential (an upper potential, an intermediate potential, and a lower potential). The power conversion device includes an upper potential semiconductor module including at least one upper potential switching element, a lower potential semiconductor module including at least one lower potential switching element, and an intermediate semiconductor module including a plurality of intermediate switching elements. A withstand voltage of the intermediate semiconductor module is configured to be higher than a withstand voltage of the upper semiconductor module and a withstand voltage of the lower semiconductor module.

CITATION LIST

Patent Literature

PTL 1: Japanese Patent Laying-Open No. 2021-61692

SUMMARY OF INVENTION

Technical Problem

One of the causes of a failure of a power conversion device is an accidental failure of a semiconductor element due to neutrons derived from cosmic rays. When the neutrons collide with a semiconductor element with a voltage being applied to the semiconductor element, the semiconductor element is broken. Such a phenomenon is called single event burnout (SEB).

An open failure of a semiconductor switching element included in a semiconductor element is a failure mode of the semiconductor element due to SEB. The open failure is a failure in which a semiconductor switching element is not turned on (remains off).

In the power conversion device described in PTL 1 described above, since the withstand voltage of the intermediate semiconductor module is configured to be higher than the withstand voltage of the upper semiconductor module and the withstand voltage of the lower semiconductor module, a breakdown resistance of the intermediate semiconductor module due to SEB can be increased. However, when an open failure due to SEB occurs in at least one of the upper potential semiconductor module and the lower potential semiconductor module, the power conversion device cannot output the upper potential or the lower potential, and thus cannot continue power conversion operation.

The present disclosure has been made to solve such a problem, and an object of the present disclosure is to provide a power conversion device that can continue power conversion operation even when an accidental failure due to cosmic rays occurs.

Solution to Problem

In an aspect of the present disclosure, a power conversion device is provided between a direct current (DC) positive bus, a DC negative bus and a DC neutral point bus, and an alternating current (AC) line, to perform power conversion between DC power and AC power. The power conversion device includes first to sixth semiconductor elements. The first semiconductor element has a first electrode connected to the DC positive bus. The second semiconductor element has a first electrode connected to a second electrode of the first semiconductor element, and a second electrode connected to the DC neutral point bus. The third semiconductor element has a first electrode connected to the DC neutral point bus. The fourth semiconductor element has a first electrode connected to a second electrode of the third semiconductor element, and a second electrode connected to the DC negative bus. The fifth semiconductor element has a first electrode connected to the first electrode of the second semiconductor element, and a second electrode connected to the AC line. The sixth semiconductor element has a first electrode connected to the AC line, and a second electrode connected to a second electrode of the third semiconductor element. Each of the first to sixth semiconductor elements includes at least one semiconductor switching element, and at least one diode connected in anti-parallel with the at least one semiconductor switching element, respectively. A breakdown resistance of the first and fourth semiconductor elements to cosmic rays is higher than a breakdown resistance of the second and third semiconductor elements to cosmic rays. A breakdown resistance of the fifth and sixth semiconductor elements is higher than the breakdown resistance of the first and fourth semiconductor elements.

Advantageous Effects of Invention

According to the present disclosure, it is possible to provide a power conversion device that can continue power conversion operation even when an accidental failure due to cosmic rays occurs.

DESCRIPTION OF EMBODIMENTS

Figure 1:
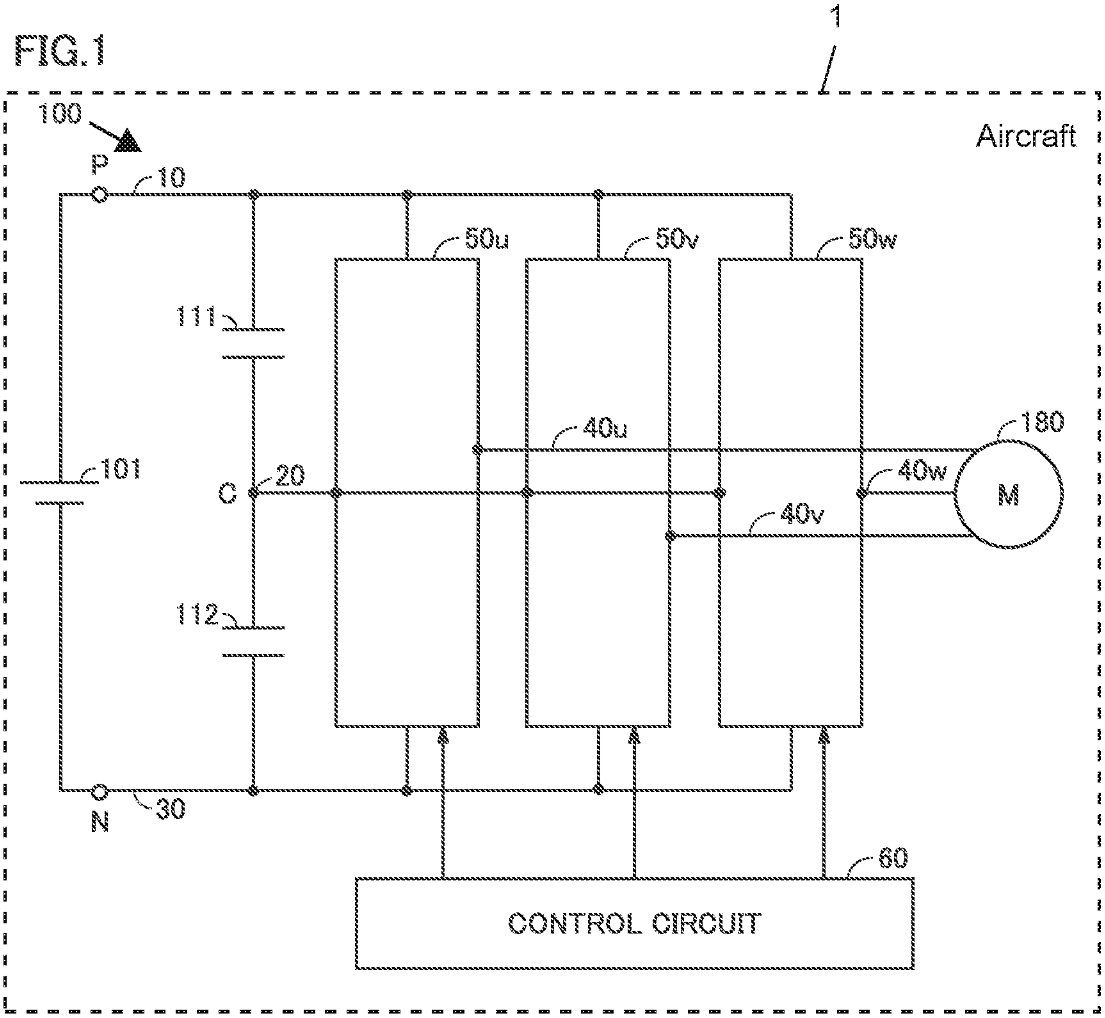
FIG. 1 is a block diagram showing a configuration in one embodiment of a power conversion device according to the present disclosure.

Hereinafter, embodiments of the present disclosure will be described in detail with reference to the drawings. It should be noted that identical or corresponding parts in the drawings will be designated by the same reference numerals, and the description thereof will not be repeated.

First Embodiment

<Configuration of Power Conversion Device>

FIG. 1 is a block diagram showing a configuration in one embodiment of a power conversion device according to the present disclosure.

As shown in FIG. 1, a power conversion device 100 according to a first embodiment is a three-level inverter, and converts DC power from a DC power supply 101 into three-phase AC power and supplies it to a load. The load is, for example, a motor 180 mounted in an aircraft 1 (e.g. diagrammatically shown in FIG. 1). Motor 180 generates a thrust force for the aircraft 1 using the three-phase AC power supplied from power conversion device 100.

Power conversion device 100 includes a DC positive bus 10, a DC neutral point bus 20, a DC negative bus 30, capacitors 111 and 112, AC lines 40U, 40V, and 40W, a U-phase arm 50*u*, a V-phase arm 50*v*, a W-phase arm 50*w*, and a control circuit 60.

DC power supply 101 supplies power from terminals P and N. DC positive bus 10 is connected to terminal P, and DC negative bus 30 is connected to terminal N. Capacitors 111 and 112 are connected in series between DC positive bus 10 and DC negative bus 30 to smooth a voltage between DC positive bus 10 and DC negative bus 30. Capacitors 111 and 112 have the same rated capacity, DC neutral point bus 20 is connected to a neutral point C, which is a connection point of capacitors 111 and 112.

U-phase arm 50*u*, V-phase arm 50*v*, and W-phase arm 50*w* are provided in parallel between DC positive bus 10 and DC negative bus 30. Each phase arm is constituted by a three-level circuit 50 shown in FIG. 2.

Figure 2:
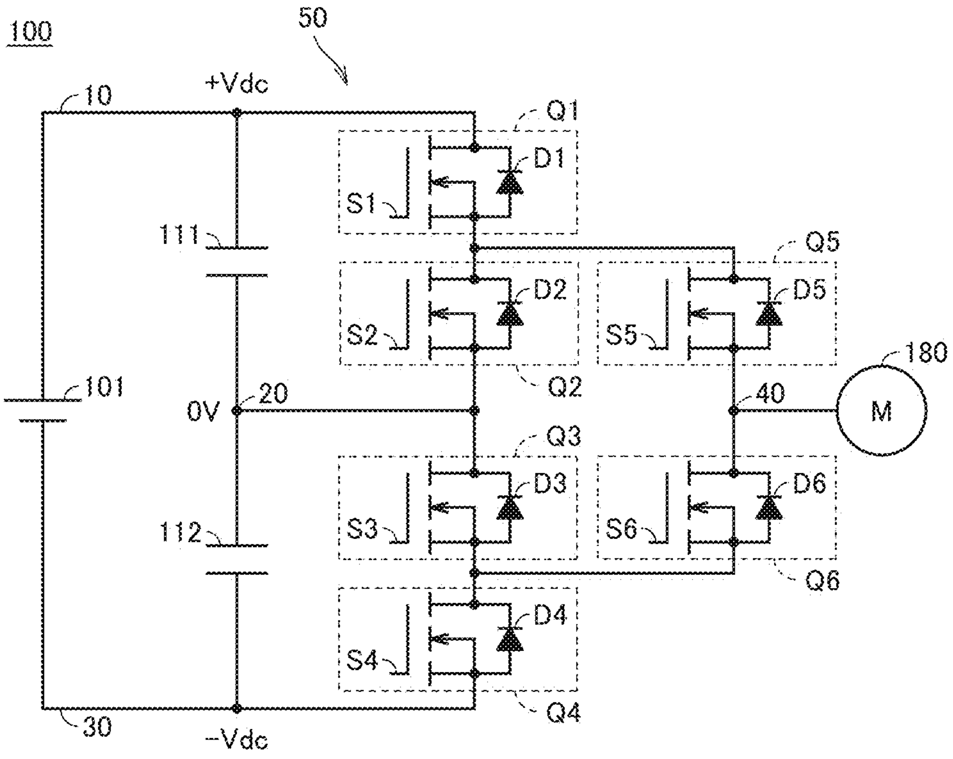
FIG. 2 is a circuit diagram showing a configuration of a three-level circuit included in the power conversion device.

FIG. 2 is a circuit diagram showing a configuration of three-level circuit 50 included in power conversion device 100.

As shown in FIG. 2, three-level circuit 50 includes six semiconductor elements Q1 to Q6. Each of semiconductor elements Q1 to Q6 includes at least one semiconductor switching element (hereinafter also simply referred to as a "switching element"), and at least one diode. In the example in FIG. 2, each semiconductor element includes one switching element and one diode. The switching element and the diode may be constituted by one chip, or may be constituted by separate chips.

In the present embodiment, a metal oxide semiconductor filed effect transistor (MOSFET) is used as a switching element. It should be noted that an insulated gate bipolar transistor (IGBT) or the like can be used as a switching element. For example, a silicon carbide (SIC)-MOSFET, a silicon (Si)-MOSFET, a SiC-IGBT, a Si-IGBT, a GaN-high electron mobility transistor (HEMT), or the like can be used as a switching element.

The at least one diode is connected in anti-parallel with the at least one switching element, respectively. It should be noted that, when the switching element is a MOSET, the diode can be constituted by a parasitic diode (body diode) of the MOSFET. As the diode, for example, a Si-diode, a SiC-diode, a SiC-schottky barrier diode (SBD), or the like can be used.

A first semiconductor element Q1 has a first electrode connected to DC positive bus 10, and a second electrode connected to a first electrode of a second semiconductor element Q2. First semiconductor element Q1 includes a switching element S1 and a diode D1.

Second semiconductor element Q2 has a first electrode connected to the second electrode of first semiconductor element Q1, and a second electrode connected to DC neutral point bus 20. Second semiconductor element Q2 includes a switching element S2 and a diode D2.

A third semiconductor element Q3 has a first electrode connected to DC neutral point bus 20, and a second electrode connected to a first electrode of a fourth semiconductor element Q4. Third semiconductor element Q3 includes a switching element S3 and a diode D3.

Fourth semiconductor element Q4 has a first electrode connected to the second electrode of third semiconductor element Q3, and a second electrode connected to DC negative bus 30. Fourth semiconductor element Q4 includes a switching element S4 and a diode D4.

A fifth semiconductor element Q5 has a first electrode connected to the first electrode of second semiconductor element Q2, and a second electrode connected to an AC line 40. Fifth semiconductor element Q5 includes a switching element S5 and a diode D5.

A sixth semiconductor element Q6 has a first electrode connected to AC line 40, and a second electrode connected to the second electrode of third semiconductor element Q3. Sixth semiconductor element Q6 includes a switching element S6 and a diode D6.

It should be noted that diodes D1, D4, D5, and D6 function as freewheeling diodes (FWDs). Diodes D2 and D3 function as clamp diodes.

Figure 3:
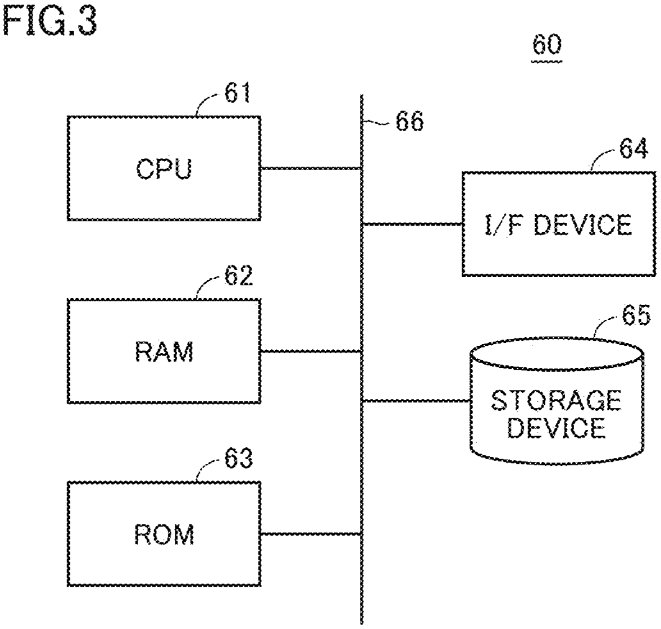
FIG. 3 is a view showing a hardware configuration of a control circuit.

Turning back to FIG. 1, control circuit 60 controls power conversion in power conversion device 100. FIG. 3 is a view showing a hardware configuration of control circuit 60. As shown in FIG. 3, control circuit 60 includes a central processing unit (CPU) 61, a random access memory (RAM) 62, a read only memory (ROM) 63, an interface (I/F) device 64, and a storage device 65. CPU 61, RAM 62, ROM 63, I/F device 64, and storage device 65 exchange various data through a communication bus 66.

CPU 61 loads a program stored in ROM 63 into RAM 62 and executes the program. The program stored in ROM 63 describes processing to be executed by control circuit 60.

I/F device 64 receives measurement data of various measurement instruments including a GPS, an altimeter, and a thermometer described later. Further, I/F device 64 transmits a control signal for controlling switching of each of semiconductor elements Q1 to Q6, to each semiconductor element.

Storage device 65 is a storage storing a variety of information, and stores information of each semiconductor element. Further, storage device 65 stores information about a failure rate of each semiconductor element due to SEB. Storage device 65 is a hard disk drive (HDD), a solid state drive (SSD), or the like, for example.

It should be noted that all or some of functions implemented by CPU 61 executing the program may be implemented using a hard-wired circuit such as an integrated circuit. For example, all or some of the functions may be implemented using an application specific integrated circuit (ASIC), a field-programmable gate array (FPGA), a complex programmable logic device (CPLD), or the like.

<Operation of Power Conversion Device>

Next, operation of three-level circuit 50 shown in FIG. 2 will be described.

Three-level circuit 50 is configured to output three potentials, which are a high potential (+Vdc), a neutral point potential (0), and a low potential (−Vdc), to AC line 40. The high potential (+Vdc) is a potential of terminal P, the neutral point potential (0) is a potential of neutral point C, and the low potential (−Vdc) is a potential of terminal N.

In a period of outputting the high potential (+Vdc), control for turning on switching elements S1 and S5 of first and fifth semiconductor elements Q1 and Q5 and turning off switching elements S2, S3, S4, and S6 of second, third, fourth, and sixth semiconductor elements Q2, Q3, Q4, and Q6 is performed.

In a period of outputting the neutral point potential (0), control for turning on switching elements S2 and S5 of second and fifth semiconductor elements Q2 and Q5, or control for turning on switching elements S3 and S6 of third and sixth semiconductor elements Q3 and Q6 is performed.

In a period of outputting the low potential (−Vdc), control for turning on switching elements S4 and S6 of fourth and sixth semiconductor elements Q4 and Q6 and turning off switching elements S1, S2, S3, and S5 of first, second, third, and fifth semiconductor elements Q1, Q2, Q3, and Q5 is performed.

<Accidental Failure of Semiconductor Element>

Next, an accidental failure of a semiconductor element will be described. One of the causes of a failure of a power conversion device is an accidental failure of a semiconductor element due to neutrons derived from cosmic rays. When cosmic rays enter the atmospheric layer of the earth, the cosmic rays collide with the atmosphere and thereby generate neutrons. When the neutrons collide with a semiconductor element with a voltage being applied, the semiconductor element may have a failure. Such a phenomenon is also called single event burnout (SEB).

As the failure of the semiconductor element due to SEB, an open failure of a switching element included in the semiconductor element is assumed. The open failure is a failure in which a switching element is not turned on (remains off). It should be noted that the failure rate of the semiconductor element due to SEB increases as the voltage applied to the semiconductor element increases.

When an open failure due to SEB occurs in any one of semiconductor elements Q1 to Q6 in three-level circuit 50 shown in FIG. 2, there is a possibility that power conversion device 100 cannot continue power conversion operation. In this case, motor 180 cannot be driven, and thus there is a concern that it may be difficult to obtain the thrust force for the aircraft. In order to stably obtain the thrust force for the aircraft, it is required that the power conversion operation in power conversion device 100 can be continued even when an open failure due to SEB occurs.

In the present embodiment, breakdown resistances of semiconductor elements Q1 to Q6 constituting three-level circuit 50 to cosmic rays (hereinafter also referred to as "cosmic ray resistances") are designed from the viewpoint of achieving continuation of the power conversion operation in power conversion device 100.

Specifically, a cosmic ray resistance of first and fourth semiconductor elements Q1 and Q4 is set to be higher than a cosmic ray resistance of second and third semiconductor elements Q2 and Q3. Further, a cosmic ray resistance of fifth and sixth semiconductor elements Q5 and Q6 is set to be higher than the cosmic ray resistance of first and fourth semiconductor elements Q1 and Q4.

The failure rate of a semiconductor element when a certain voltage is applied thereto, due to SEB, decreases as a cosmic ray resistance of the semiconductor element increases. Therefore, when voltages applied to semiconductor elements Q1 to Q6 are equal to one another, a failure rate of first and fourth semiconductor elements Q1 and Q4 is lower than a failure rate of second and third semiconductor elements Q2 and Q3. A failure rate of fifth and sixth semiconductor elements Q5 and Q6 is lower than the failure rate of first and fourth semiconductor elements Q1 and Q4.

By designing the cosmic ray resistances of semiconductor elements Q1 to Q6 as described above, the power conversion operation in power conversion device 100 can be continued even under an environment in which the amount of neutrons derived from cosmic rays increases. This is because, even when an open failure occurs in at least one of second and third semiconductor elements Q2 and Q3, occurrence of an open failure is suppressed in first and fourth semiconductor elements Q1 and Q4 and fifth and sixth semiconductor elements Q5 and Q6 having the failure rates lower than that of second and third semiconductor elements Q2 and Q3.

More specifically, even in a situation where an open failure occurs in second and third semiconductor elements Q2 and Q3, three-level circuit 50 can output the high potential (+Vdc) by turning on first and fifth semiconductor elements Q1 and Q5. Further, three-level circuit 50 can output the low potential (−Vdc) by turning on fourth and sixth semiconductor elements Q4 and Q6. That is, even in the situation where an open failure occurs in second and third semiconductor elements Q2 and Q3, three-level circuit 50 can operate as a two-level circuit. As a result, power conversion device 100 can continue the power conversion operation as a two-level inverter, even when an accidental failure due to cosmic rays occurs.

Here, it is also possible to suppress an open failure in semiconductor elements Q1 to Q6 and continue the power conversion operation in power conversion device 100, by equally setting the cosmic ray resistances of all semiconductor elements Q1 to Q6 to be high. However, since semiconductor elements having a high cosmic ray resistance are used for all semiconductor elements Q1 to Q6, the cost of the semiconductor elements increases. As a result, there is a concern that the cost of power conversion device 100 may increase.

In contrast, in the first embodiment, since the cosmic ray resistances of semiconductor elements Q1 to Q6 have a magnitude relation such that operation as a two-level circuit can be maintained as described above, an increase in the cost of power conversion device 100 can be suppressed, when compared with a configuration that the cosmic ray resistances of all semiconductor elements Q1 to Q6 are set to be high.

Second Embodiment

The first embodiment described above has described a configuration that the cosmic ray resistances of semiconductor elements Q1 to Q6 constituting three-level circuit 50 have a magnitude relation. Second to fourth embodiments will describe concrete configurations of three-level circuit 50 for implementing this configuration.

Figure 4:
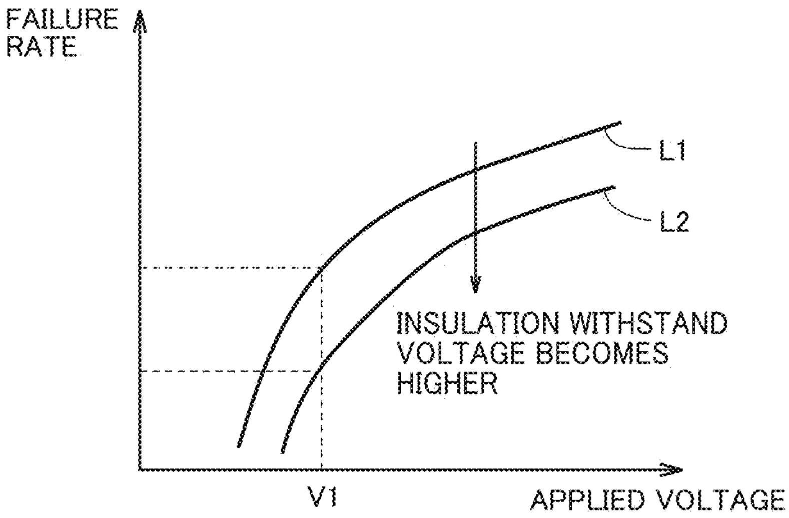
FIG. 4 is a view schematically showing the relation between a voltage applied to a semiconductor element and a failure rate of the semiconductor element due to SEB.

FIG. 4 is a view schematically showing the relation between a voltage applied to a semiconductor element and a failure rate of the semiconductor element due to SEB. In FIG. 4, the axis of ordinate indicates the failure rate, and the axis of abscissa indicates the applied voltage. The failure rate can be calculated using an index called Failure-in-Time (FIT), for example. The FIT is a unit indicating the failure rate, and indicates how many semiconductor elements have a failure within a $10^9$ time. A smaller FIT indicates a lower failure rate.

Each of curves L1 and L2 shown in FIG. 4 shows the relation between the applied voltage and the failure rate of a semiconductor element. According to these curves, the failure rate of a semiconductor element increases as the voltage applied to the semiconductor element increases.

Here, the failure rate of a semiconductor element correlates to an insulation withstand voltage of the semiconductor element. In FIG. 4, curve L1 shows the relation between the applied voltage and the failure rate of a semiconductor element having a first insulation withstand voltage. Curve L2 shows the relation between the applied voltage and the failure rate of a semiconductor element having a second insulation withstand voltage. The second insulation withstand voltage is higher than the first insulation withstand voltage.

When curve L1 is compared with curve L2, the semiconductor element having a higher insulation withstand voltage has a lower failure rate when a voltage V1 is applied. It should be noted that the correlation between the insulation withstand voltage and the failure rate of a semiconductor element shown in FIG. 4 is invariant irrespective of the amount of neutrons emitted to the semiconductor element.

It should be noted that it is assumed that the two semiconductor elements shown in FIG. 4 having insulation withstand voltages different from each other are each a MOSFET, and have element areas equal to each other. These two semiconductor elements are only different in the thickness or doping concentration of a drift layer that maintains a withstand voltage of the MOSFET.

In the second embodiment, the correlation between the insulation withstand voltage and the failure rate of a semiconductor element is utilized to provide a magnitude relation to insulation withstand voltages of semiconductor elements Q1 to Q6, and thereby to provide a magnitude relation to the cosmic ray resistances of semiconductor elements Q1 to Q6.

Figure 5:
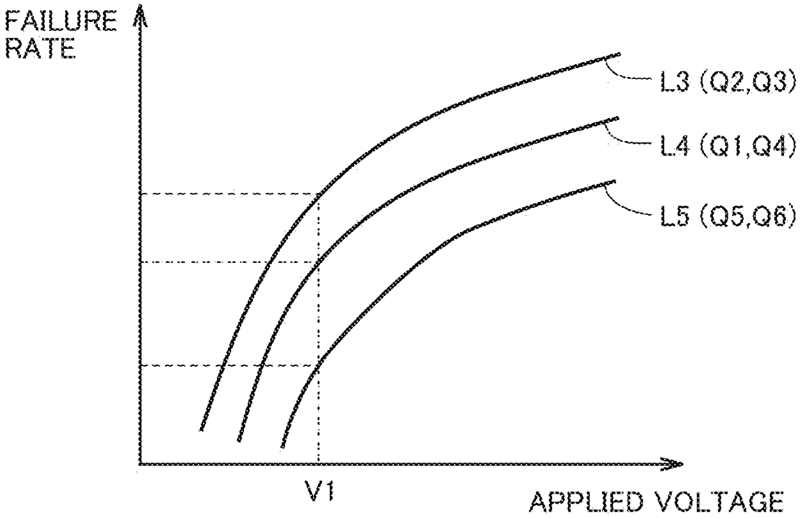
FIG. 5 is a view schematically showing the relation between the voltage applied to a semiconductor element and the failure rate.

FIG. 5 is a view schematically showing the relation between the voltage applied to semiconductor elements Q1 to Q6 and the failure rate. In FIG. 5, the axis of ordinate indicates the failure rate, and the axis of abscissa indicates the applied voltage.

A curve L3 shown in FIG. 5 shows the relation between the applied voltage and the failure rate of second and third semiconductor elements Q2 and Q3. A curve L4 shows the relation between the applied voltage and the failure rate of first and fourth semiconductor elements Q1 and Q4. A curve L5 shows the relation between the applied voltage and the failure rate of fifth and sixth semiconductor elements Q5 and Q6. In any of curves L3 to L5, the failure rate of the semiconductor elements increases as the voltage applied to the semiconductor elements increases.

As shown in FIG. 5, when voltage V1 is applied, the failure rate of first and fourth semiconductor elements Q1 and Q4 is lower than the failure rate of second and third semiconductor elements Q2 and Q3. The failure rate of fifth and sixth semiconductor elements Q5 and Q6 is lower than the failure rate of first and fourth semiconductor elements Q1 and Q4.

The failure rates of semiconductor elements Q1 to Q6 shown in FIG. 5 can be achieved by providing a magnitude relation to the insulation withstand voltages of semiconductor elements Q1 to Q6. Specifically, the insulation withstand voltage of first and fourth semiconductor elements Q1 and Q4 is set to be higher than the insulation withstand voltage of second and third semiconductor elements Q2 and Q3. The insulation withstand voltage of fifth and sixth semiconductor elements Q5 and Q6 is set to be higher than the insulation withstand voltage of first and fourth semiconductor elements Q1 and Q4.

When semiconductor elements Q1 to Q6 are each a MOSFET and have element areas equal to one another, the magnitude relation of the insulation withstand voltages described above can be achieved by adjusting the thickness or doping concentration of the drift layer.

Specifically, since the insulation withstand voltage becomes higher as the drift layer of the MOSFET is thicker, it is only necessary to set the drift layers of first and fourth semiconductor elements Q1 and Q4 to be thicker than the drift layers of second and third semiconductor elements Q2 and Q3, and set the drift layers of fifth and sixth semiconductor elements Q5 and Q6 to be thicker than the drift layers of first and fourth semiconductor elements Q1 and Q4.

Alternatively, since the insulation withstand voltage becomes higher as the drift layer of the MOSFET has a lower doping concentration, it is only necessary to set the doping concentration of the drift layers of first and fourth semiconductor elements Q1 and Q4 to be lower than the doping concentration of the drift layers of second and third semiconductor elements Q2 and Q3, and set the doping concentration of the drift layers of fifth and sixth semiconductor elements Q5 and Q6 to be lower than the doping concentration of the drift layers of first and fourth semiconductor elements Q1 and Q4.

Third Embodiment

Figure 6:
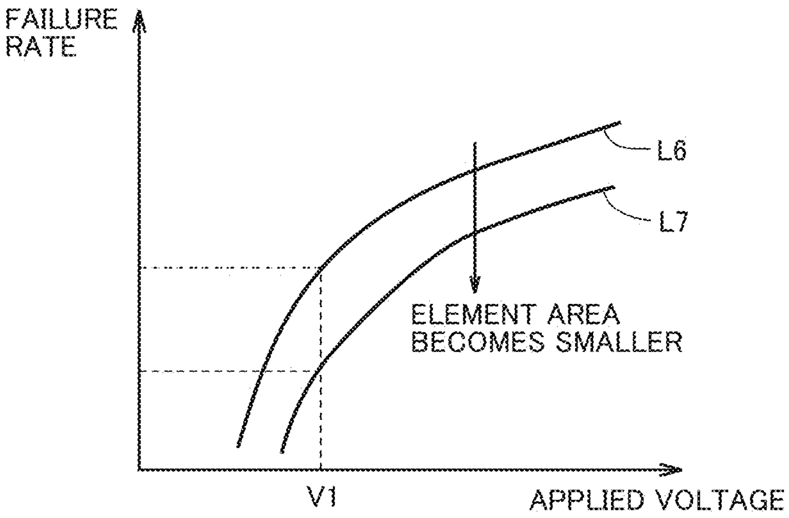
FIG. 6 is a view schematically showing the relation between a voltage applied to a semiconductor element and a failure rate of the semiconductor element due to SEB.

FIG. 6 is a view schematically showing the relation between a voltage applied to a semiconductor element and a failure rate of the semiconductor element due to SEB. In FIG. 6, the axis of ordinate indicates the failure rate, and the axis of abscissa indicates the applied voltage.

Each of curves L6 and L7 shown in FIG. 6 shows the relation between the applied voltage and the failure rate of a semiconductor element. The failure rate of a semiconductor element also correlates to an element area of the semiconductor element. In FIG. 6, curve L6 shows the relation between the applied voltage and the failure rate of a semiconductor element having a first element area. Curve L7 shows the relation between the applied voltage and the failure rate of a semiconductor element having a second element area. The second element area is smaller than the first element area.

When curve L6 is compared with curve L7, the semiconductor element having a smaller element area has a lower failure rate when voltage V1 is applied. This is because the amount of neutrons emitted to a semiconductor element decreases as the semiconductor element has a smaller element area.

In the third embodiment, the correlation between the element area and the failure rate of a semiconductor element shown in FIG. 6 is utilized to provide a magnitude relation to element areas of semiconductor elements Q1 to Q6, and thereby to provide a magnitude relation to the cosmic ray resistances of semiconductor elements Q1 to Q6. Specifically, the element area of first and fourth semiconductor elements Q1 and Q4 is set to be smaller than the element area of second and third semiconductor elements Q2 and Q3. The element area of fifth and sixth semiconductor elements Q5 and Q6 is set to be smaller than the element area of first and fourth semiconductor elements Q1 and Q4.

It should be noted that, when a semiconductor element has a smaller element area, a current per unit area of the semiconductor element (current density) may increase. In this case, as the current density of the semiconductor element increases, an on-resistance of the semiconductor element decreases, and thus a variation (dI/dt) of a short-circuit current flowing to the semiconductor element increases. In order to cut off an overcurrent flowing to the semiconductor element, it is necessary to provide a short-circuit protection circuit to the semiconductor element.

The short-circuit protection circuit can be configured to include a controller that determines whether or not a current I flowing to a source of a MOSFET is an overcurrent based on the variation (dI/dt) of current I, and outputs a determination result thereof to a gate driver of the MOSFET, for example. With this configuration, the controller compares the variation of current I with a predetermined threshold, and when the variation exceeds the threshold, the controller detects an overcurrent.

However, the controller is configured not to perform determination of an overcurrent during a mask period. The mask period is set such that an overcurrent is not detected during a period in which current I changes steeply immediately after turning-on of the MOSFET.

A threshold in short-circuit protection circuits of first and fourth semiconductor elements Q1 and Q4 is set to a value lower than a threshold in short-circuit protection circuits of second and third semiconductor elements Q2 and Q3. A threshold in short-circuit protection circuits of fifth and sixth semiconductor elements Q5 and Q6 is set to a value lower than the threshold in the short-circuit protection circuits of first and fourth semiconductor elements Q1 and Q4. Thereby, an overcurrent flowing to each of semiconductor elements Q1 to Q6 can be reliably cut off.

Fourth Embodiment

Figure 7:
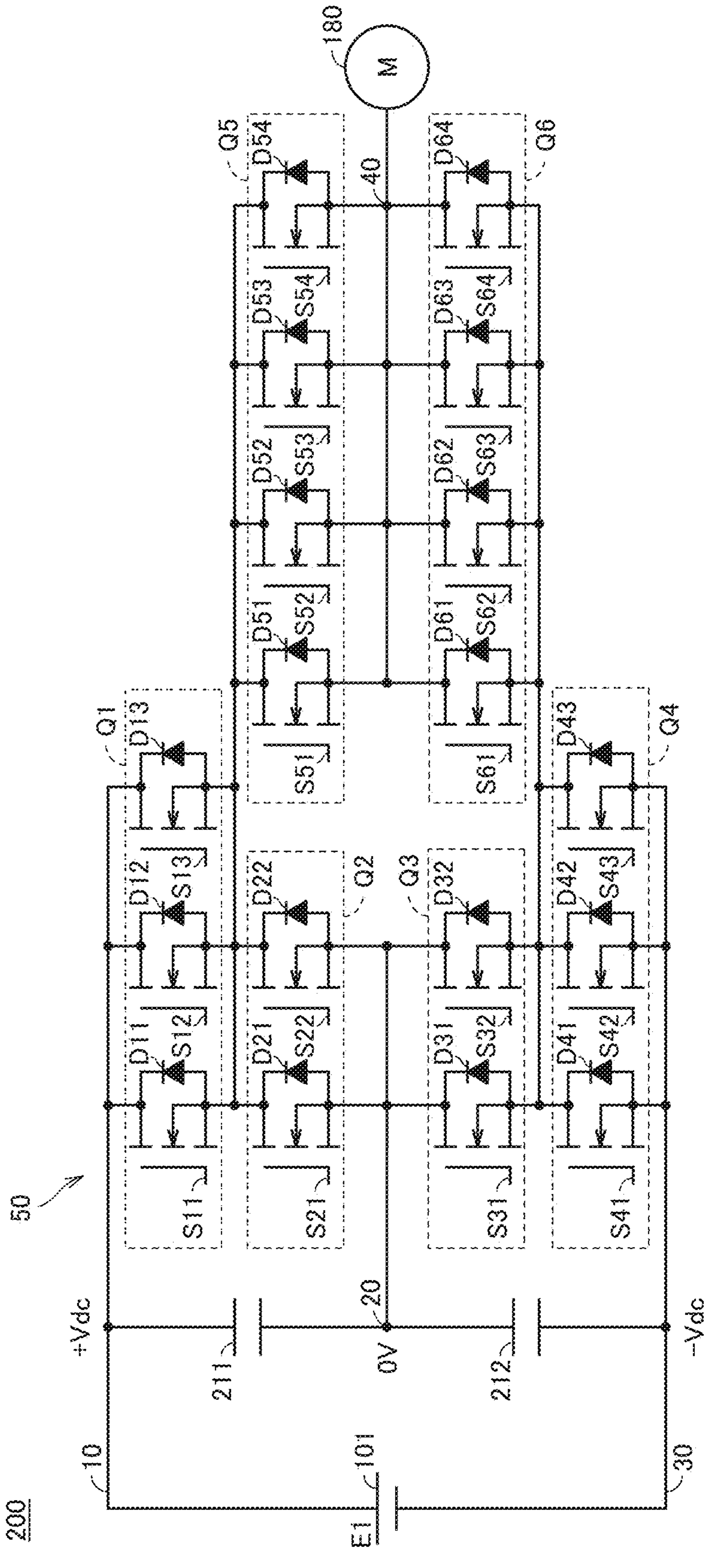
FIG. 7 is a circuit diagram showing a configuration of a three-level circuit included in a power conversion device according to a fourth embodiment.

FIG. 7 is a circuit diagram showing a configuration of three-level circuit 50 included in a power conversion device 200 according to the fourth embodiment.

Three-level circuit 50 shown in FIG. 7 has the same basic configuration as that of three-level circuit 50 shown in FIG. 2, and has a difference in the configuration of each of semiconductor elements Q1 to Q6. Semiconductor elements Q1 to Q6 shown in FIG. 7 are different from semiconductor elements Q1 to Q6 shown in FIG. 2 in that each semiconductor element has a plurality of switching elements and a plurality of diodes.

Specifically, first semiconductor element Q1 includes three switching elements S11 to S13 connected in parallel, and three diodes D11 to D13 connected in anti-parallel with three switching elements S11 to S13, respectively.

Second semiconductor element Q2 includes two switching elements S21 and S22 connected in parallel, and two diodes D21 and D22 connected in anti-parallel with two switching elements S21 and S22, respectively.

Third semiconductor element Q3 includes two switching elements S31 and S32 connected in parallel, and two diodes D31 and D32 connected in anti-parallel with two switching elements S31 and S32, respectively.

Fourth semiconductor element Q4 includes three switching elements S41 to S43 connected in parallel, and three diodes D41 to D43 connected in anti-parallel with three switching elements S41 to S43, respectively.

Fifth semiconductor element Q5 includes four switching elements S51 to S54 connected in parallel, and four diodes D51 to D54 connected in anti-parallel with four switching elements S51 to S54, respectively.

Sixth semiconductor element Q6 includes four switching elements S61 to S64 connected in parallel, and four diodes D61 to D64 connected in anti-parallel with four switching elements S61 to S64, respectively.

As shown in FIG. 7, the number of switching elements included in each of first and fourth semiconductor elements Q1 and Q4 is larger than the number of switching elements included in each of second and third semiconductor elements Q2 and Q3. The number of switching elements included in each of fifth and sixth semiconductor elements Q5 and Q6 is larger than the number of switching elements included in each of the first and fourth semiconductor elements. It should be noted that the number of switching elements included in each of semiconductor elements Q1 to Q6 is not limited to the number shown in FIG. 7, as long as the magnitude relation described above is satisfied among semiconductor elements Q1 to Q6.

Since one semiconductor element is constituted by connecting a plurality of switching elements in parallel, a failure rate of the semiconductor element can be decreased. This is because, even when an open failure occurs in any one of the plurality of switching elements, switching of the semiconductor element can be continued by the remaining normal switching elements. As the number of switching elements connected in parallel increases, a failure rate as the entire plurality of switching elements decreases, and thus the failure rate of the semiconductor element can also be decreased.

Accordingly, in the fourth embodiment, by setting the number of switching elements included in each of first and fourth semiconductor elements Q1 and Q4 to be larger than the number of switching elements included in each of second and third semiconductor elements Q2 and Q3, a failure rate of first and fourth semiconductor elements Q1 and Q4 is set to be lower than a failure rate of second and third semiconductor elements Q2 and Q3. By setting the number of switching elements included in each of fifth and sixth semiconductor elements Q5 and Q6 to be larger than the number of switching elements included in each of first and fourth semiconductor elements Q1 and Q4, a failure rate of fifth and sixth semiconductor elements Q5 and Q6 is set to be lower than the failure rate of first and fourth semiconductor elements Q1 and Q4.

That is, in the fourth embodiment, a magnitude relation is provided to the number of switching elements included in each of semiconductor elements Q1 to Q6, to provide a magnitude relation to the cosmic ray resistances of semiconductor elements Q1 to Q6. Thereby, it is possible to establish a power conversion device that can continue power conversion operation even when an accidental failure due to cosmic rays occurs, using semiconductor elements constituted by general-purpose switching elements.

Fifth Embodiment

In power conversion device 200 according to the fourth embodiment described above, power conversion can be performed by switching all of the plurality of switching elements connected in parallel, in each of semiconductor elements Q1 to Q6.

Alternatively, the number of switching elements to be switched, of the plurality of switching elements connected in parallel, may be changed in each of semiconductor elements Q1 to Q6, according to the state of power conversion device 200.

A fifth embodiment will describe a configuration that the number of switching elements to be switched is changed in power conversion device 200 according to the fourth embodiment, according to the environment in which power conversion device 200 is placed, and the element temperature of each semiconductor element.

Figure 8:
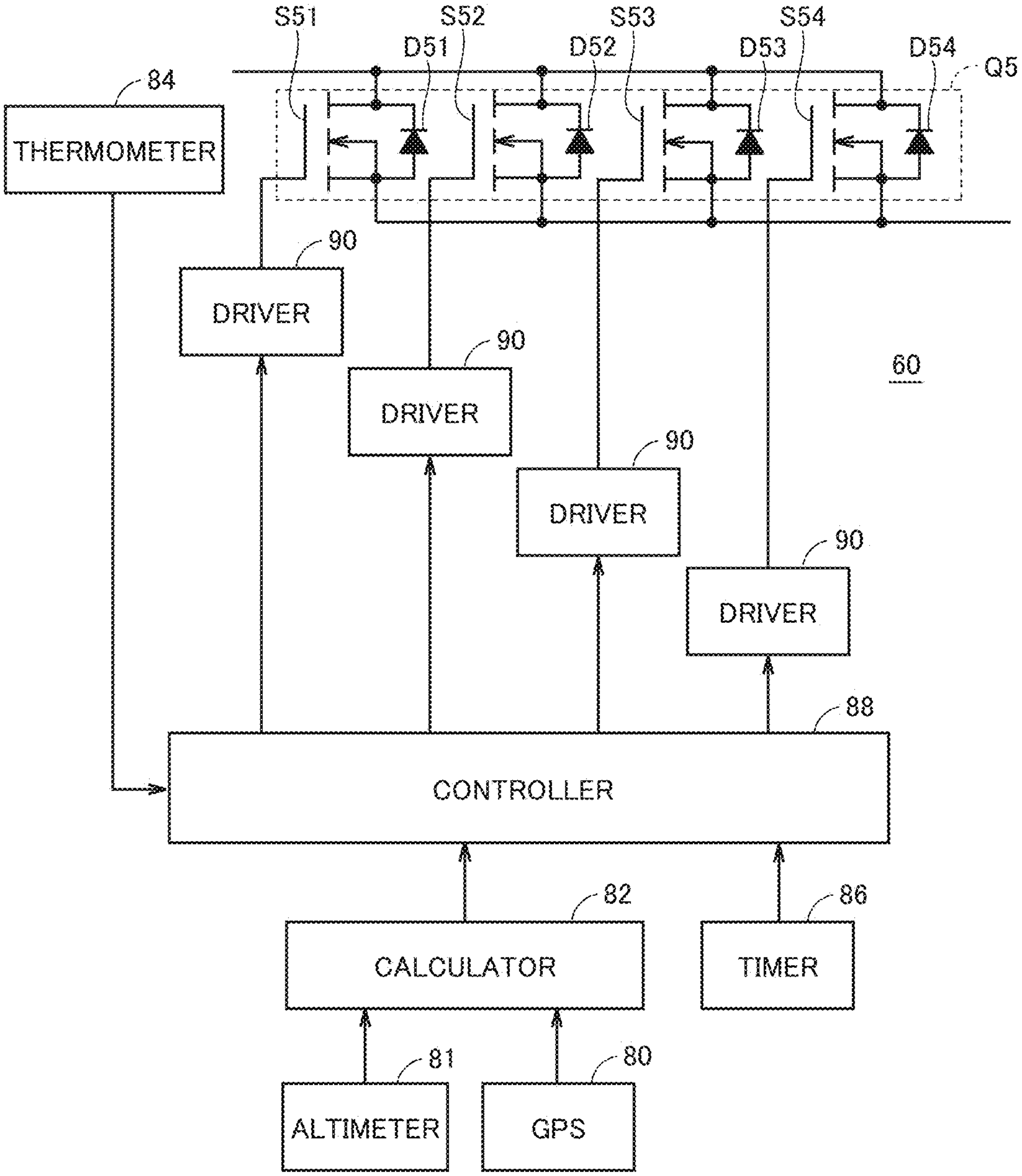
FIG. 8 is a view showing a functional configuration of a control circuit of a power conversion device.

FIG. 8 is a view showing a functional configuration of control circuit 60 of power conversion device 200. FIG. 8 shows a portion controlling switching of fifth semiconductor element Q5, included in control circuit 60. Although not shown, a portion controlling switching of each of other semiconductor elements Q1 to Q4 and Q6 also has the same configuration as that shown in FIG. 8.

As shown in FIG. 8, control circuit 60 includes a global positioning system (GPS) 80, an altimeter 81, a calculator 82, a thermometer 84, a controller 88, four drivers 90, and a timer 86.

GPS 80 measures a latitude and a longitude of a current position of power conversion device 200, and outputs measurement values thereof to calculator 82. Altimeter 81 measures an altitude of the current position of power conversion device 200, and outputs a measurement value thereof to calculator 82. For example, when power conversion device 200 is mounted in an aircraft, GPS 80 and altimeter 81 measure a latitude, a longitude, and an altitude of the flying aircraft. It should be noted that altimeter 81 is not required when the altitude of power conversion device 200 can be calculated from the measurement values of GPS 80.

Calculator 82 calculates the amount of neutrons at the current position of power conversion device 200 based on the measurement values inputted from GPS 80 and altimeter 81. The amount of neutrons is the number of neutrons per unit time and unit area, and varies depending on the latitude, the longitude, and the altitude of the current position of power conversion device 200.

It should be noted that a spectrum of neutrons depending on the altitude, the latitude, and the longitude can be calculated using EXPACS (Excel-based Program for calculating Atmospheric Cosmic-ray Spectrum), for example. The EXPACS is a program that can calculate a cosmic-ray flux and energy thereof at any time and location in the atmosphere. The spectrum of neutrons is data representing the number of neutrons per unit time and unit area that exist in a wide energy band of neutrons. From the spectrum of neutrons obtained by the EXPACS, data representing dependency of the number of neutrons having any energy on the latitude, the longitude, and the altitude can be obtained.

Thermometer 84 measures an element temperature of fifth semiconductor element Q5, and outputs a measurement value thereof to controller 88.

The amount of neutrons at the current position of power conversion device 200 is directly linked to a failure rate of fifth semiconductor element Q5 due to SEB. As the amount of neutrons increases, the failure rate of fifth semiconductor element Q5 increases. For example, as the altitude of power conversion device 200 becomes higher, the amount of neutrons increases, and thus the failure rate of fifth semiconductor element Q5 increases.

Figure 9:
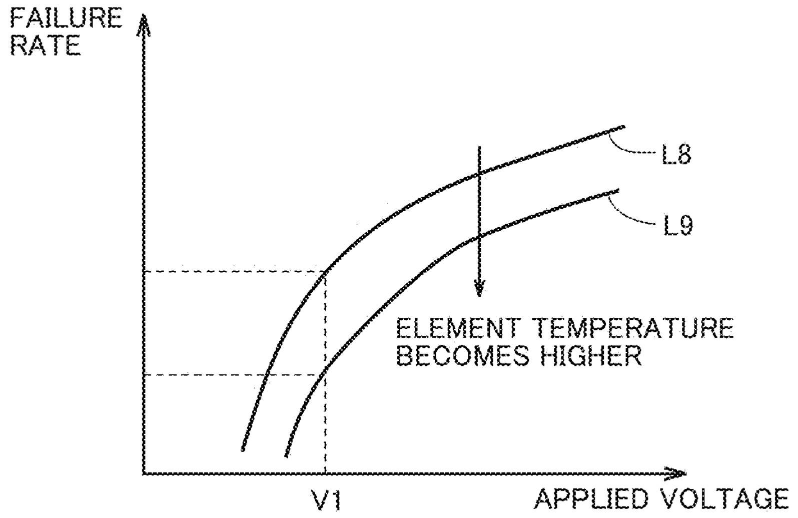
FIG. 9 is a view illustrating the correlation between an element temperature and a failure rate of a fifth semiconductor element.

On the other hand, the failure rate of fifth semiconductor element Q5 correlates to the element temperature. FIG. 9 is a view illustrating the correlation between the element temperature and the failure rate of fifth semiconductor element Q5. In FIG. 9, the axis of ordinate indicates the failure rate, and the axis of abscissa indicates an applied voltage.

FIG. 9 shows curves L8 and L9 each showing the relation between the element temperature and the failure rate of fifth semiconductor element Q5. Curve L8 shows the relation between a voltage applied to fifth semiconductor element Q5 at a first element temperature and the failure rate. Curve L9 shows the relation between a voltage applied to fifth semiconductor element Q5 at a second element temperature and the failure rate. The second element temperature is higher than the first element temperature.

As shown in FIG. 9, when voltage V1 is applied to fifth semiconductor element Q5, the failure rate at the second element temperature is lower than the failure rate at the first element temperature. This is because, generally, an insulation withstand voltage of a semiconductor element increases as an element temperature (a junction temperature) increases, and the insulation withstand voltage of the semiconductor element decreases as the element temperature (junction temperature) decreases. Therefore, at a high element temperature, the insulation withstand voltage increases, and thus the failure rate of the semiconductor element decreases. Conversely, at a low element temperature, the insulation withstand voltage decreases, and thus the failure rate of the semiconductor element increases. It should be noted that the relation between the element temperature (junction temperature) and the failure rate of the semiconductor element is invariant irrespective of the altitude of the current position of the semiconductor element.

Turning back to FIG. 8, controller 88 controls switching of four switching elements S51 to S54 constituting fifth semiconductor element Q5, based on the amount of neutrons calculated by calculator 82 and the measurement value of the element temperature of fifth semiconductor element Q5 measured by thermometer 84.

Specifically, four drivers 90 are provided corresponding to four switching elements S51 to S54, respectively. Each driver 90 generates a gate signal for driving the corresponding switching element according to the control signal provided from controller 88.

Figure 10:
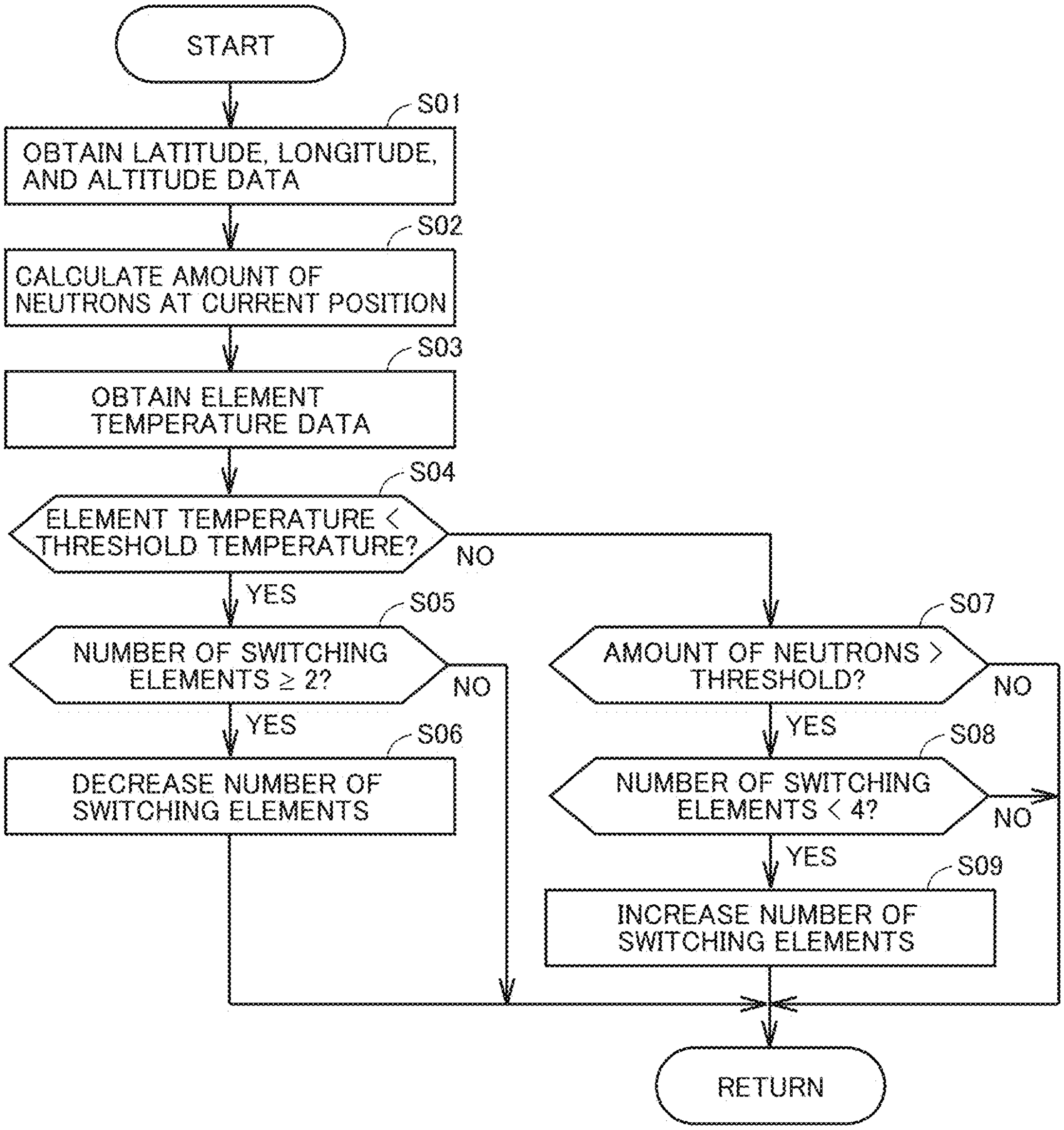
FIG. 10 is a flowchart showing an example of a procedure for processing of adjusting the number of switching elements to be switched.

Controller 88 changes the number of switching elements to be switched, of four switching elements SS1 to S54, according to the amount of neutrons and the element temperature of fifth semiconductor element Q5. FIG. 10 is a flowchart showing an example of a procedure for processing of adjusting the number of switching elements to be switched. A series of processing shown in this flowchart is performed by control circuit 60 at every predetermined cycle, while power conversion device 200 is operated.

As shown in FIG. 10, first, control circuit 60 obtains measurement data of the latitude and the longitude of the current position of power conversion device 200 measured by GPS 80, and obtains measurement data of the altitude of the current position of power conversion device 200 measured by altimeter 81 (step S01).

Control circuit 60 calculates the amount of neutrons at the current position of power conversion device 200, using the obtained measurement data of the latitude, the longitude, and the altitude of power conversion device 200 (step S02).

Control circuit 60 obtains measurement data of the element temperature of fifth semiconductor element Q5 measured by thermometer 84 (step S03).

Control circuit 60 determines the number of switching elements to be switched in fifth semiconductor element Q5, using the amount of neutrons calculated in S02 and the measurement data of the element temperature obtained in S03.

Specifically, control circuit 60 determines whether or not the element temperature of fifth semiconductor element Q5 is lower than a predetermined threshold temperature (step S04). When the element temperature of fifth semiconductor element Q5 is lower than the threshold temperature (when it is determined as YES in S04), then control circuit 60 determines whether or not the number of switching elements currently being switched is two or more (step SOS).

When the number of switching elements currently being switched is two or more (when it is determined as YES in S05), control circuit 60 fixes one of the switching elements being switched, to an OFF state, and thereby stops switching of the switching element. That is, control circuit 60 decreases the number of switching elements to be switched, by one (step S06). On the other hand, when the number of switching elements currently being switched is one (when it is determined as NO in S05), control circuit 60 skips the processing in S06, and thereby maintains the number of switching elements being switched.

In contrast, when the element temperature of fifth semiconductor element Q5 is higher than or equal to the threshold temperature in S04 (when it is determined as NO in S04), control circuit 60 compares the amount of neutrons calculated in S02 with a predetermined threshold (step S07).

When the amount of neutrons is more than the threshold (when it is determined as YES in S07), then control circuit 60 determines whether or not the number of switching elements currently being switched is less than four (step S08). When the number of switching elements currently being switched is less than four (when it is determined as YES in step S08), control circuit 60 turns on one switching element in a stopped state, and thereby starts switching of the switching element. That is, control circuit 60 increases the number of switching elements to be switched, by one (step S09).

On the other hand, when the amount of neutrons is less than or equal to the threshold (when it is determined as NO in S07), control circuit 60 skips the processing in S08 and S09, and thereby maintains the number of switching elements being switched.

In the flowchart shown in FIG. 10, when the element temperature of fifth semiconductor element Q5 is lower than the threshold temperature, control for decreasing the number of switching elements to be switched is performed. Thus, by decreasing the number of switching elements to be switched, a current flowing to each switching element being switched increases, and thereby the amount of heat generated in the switching element increases. As a result, the element temperature of fifth semiconductor element Q5 increases. Since the insulation withstand voltage of fifth semiconductor element Q5 increases as the element temperature increases, the failure rate of fifth semiconductor element Q5 decreases.

Further, in the flowchart shown in FIG. 10, when the amount of neutrons at the current position exceeds the threshold, control for increasing the number of switching elements to be switched is performed. Thus, by increasing the number of switching elements to be switched in a case where the amount of neutrons increases and the failure rate of each switching element increases, switching of fifth semiconductor element Q5 can be continued even when an open failure occurs in any of the plurality of switching elements.

It should be noted that, while the fifth embodiment has described the processing of adjusting the number of switching elements to be switched in fifth semiconductor element Q5, the same processing can also be performed in sixth semiconductor element Q6, first and fourth semiconductor elements Q1 and Q4, and second and third semiconductor elements Q2 and Q3. Thereby, the failure rate of each of semiconductor elements Q1 to Q6 can be decreased.

Sixth Embodiment

The fifth embodiment described above has described processing of stopping a portion of a plurality of switching elements included in a semiconductor element included in power conversion device 200 according to the fourth embodiment, according to the element temperature of the semiconductor element. A sixth embodiment will describe processing of changing a switching element whose switching is to be stopped, at a predetermined cycle, in the above processing.

Figure 11:
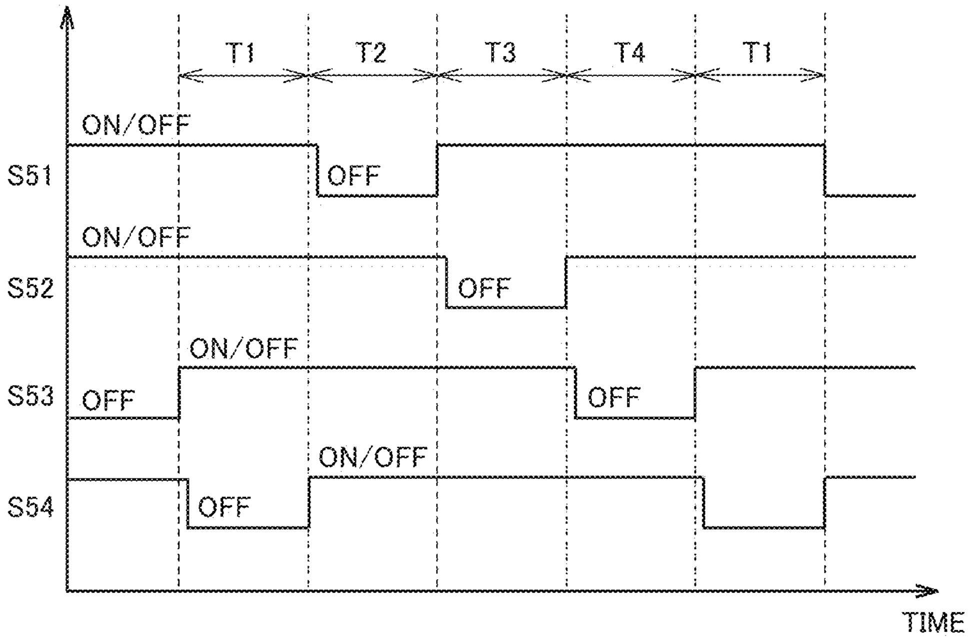
FIG. 11 is a time chart showing an example of a procedure for processing of changing a switching element whose switching is to be stopped, in the fifth semiconductor element.

FIG. 11 is a time chart showing an example of a procedure for processing of changing a switching element whose switching is to be stopped, in fifth semiconductor element Q5. In FIG. 11, it is assumed that switching of one of four switching elements S51 to S54 included in fifth semiconductor element Q5 is to be stopped.

Control circuit 60 changes a switching element whose switching is to be stopped, at every preset time, according to an output signal of timer 86 (see FIG. 8). Specifically, when a time T1 starts at a time instant t0, control circuit 60 switches switching elements S51, S52, and S53, and stops switching of switching element S54. It should be noted that, at time instant 10, control circuit 60 starts switching element S53, and then stops switching of switching element S54.

When a time T2 starts at a time instant t1, control circuit 60 switches switching elements S52, S53, and S54, and stop switching of switching element S51. It should be noted that, at time instant t1, control circuit 60 starts switching element S54, and then stops switching of switching element S51.

When a time T3 starts at a time instant t2, control circuit 60 switches switching elements S51, S53, and S54, and stop switching of switching element S52. It should be noted that, at time instant t2, control circuit 60 starts switching element S51, and then stops switching of switching element S52.

When a time T4 starts at a time instant t3, control circuit 60 switches switching elements S51, S52, and S54, and stop switching of switching element S53. It should be noted that, at time instant t3, control circuit 60 starts switching element S52, and then stops switching of switching element S53.

Accordingly, in the sixth embodiment, by changing a switching element whose switching is to be stopped, at a predetermined cycle, a continuous operation time of each switching element can be shortened. Thereby, deterioration of the switching elements can be reduced, and thus the failure rate of each switching element can be decreased.

Further, the plurality of switching elements can have operation times equal to one another.

Seventh Embodiment

Figure 12:
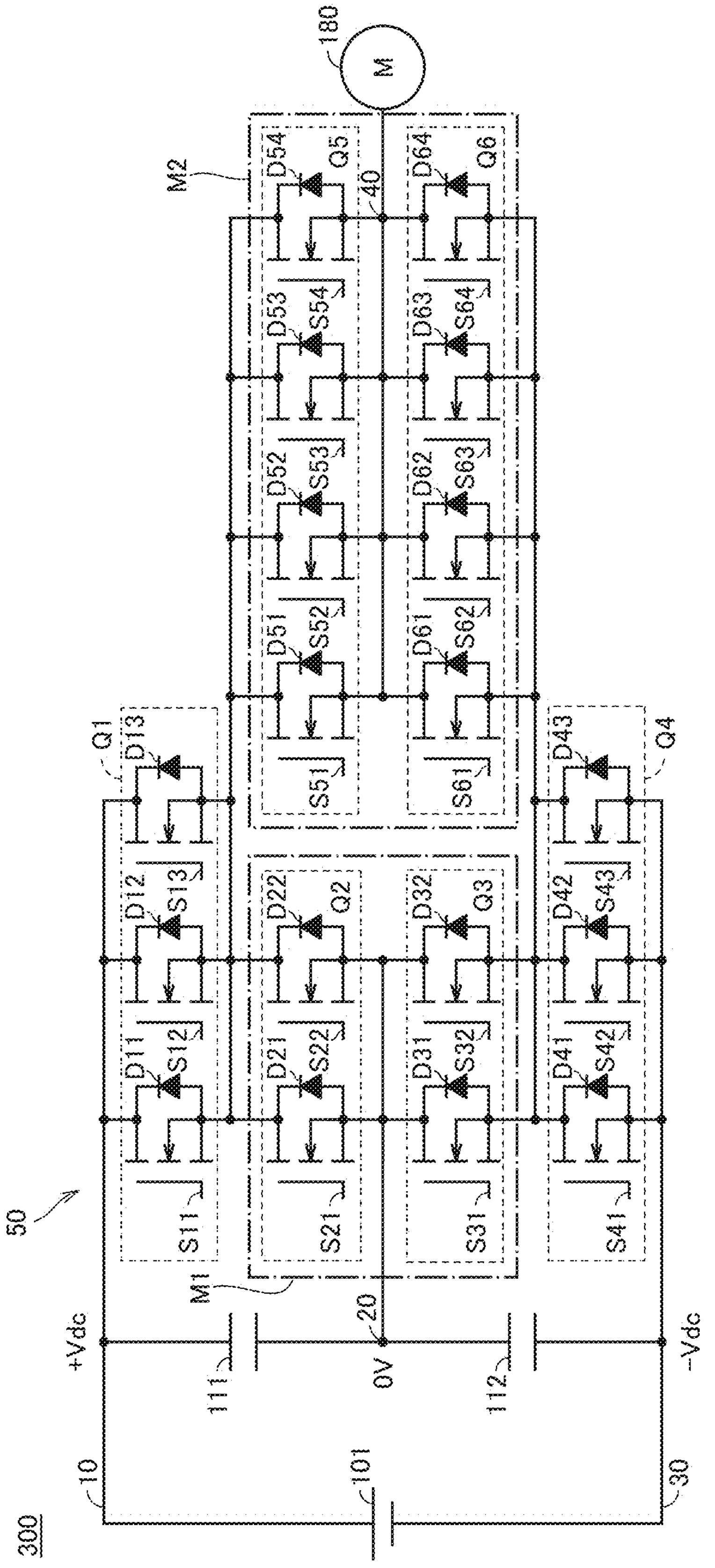
FIG. 12 is a circuit diagram showing a configuration of a three-level circuit included in a power conversion device according to a seventh embodiment.

FIG. 12 is a circuit diagram showing a configuration of three-level circuit 50 included in a power conversion device 300 according to a seventh embodiment.

Three-level circuit 50 shown in FIG. 12 has the same basic configuration as that of three-level circuit 50 shown in FIG. 7. Three-level circuit 50 shown in FIG. 12 is different from three-level circuit 50 shown in FIG. 7 in that it includes power modules M1 and M2.

Specifically, power module M1 includes second and third semiconductor elements Q2 and Q3. That is, power module M1 includes four switching elements and four diodes (clamp diodes). Power module M1 corresponds to one embodiment of a "first semiconductor module".

Power module M2 includes fifth and sixth semiconductor elements Q5 and Q6. That is, power module M2 includes eight switching elements and eight diodes (freewheeling diodes). Power module M2 corresponds to one embodiment of a "second semiconductor module".

Accordingly, in the seventh embodiment, since a plurality of semiconductor elements each having a plurality of switching elements are included in the same power module, the plurality of semiconductor elements can be disposed closer, when compared with a configuration in which a plurality of semiconductor elements are individually packaged. Accordingly, space-saving packaging can be achieved. Further, power conversion device 300 can have a smaller size.

Furthermore, when a heat sink for cooling each semiconductor element is attached, it is only necessary to attach the heat sink to a power module, and thus assembly workability can be improved. Further, the power modules are excellent in availability.

It should be noted that, regarding the embodiments described above, it is initially intended at the time of filing of the application to appropriately combine the configurations described in the embodiments, including any combination not mentioned in the specification, within a range free of inconsistency or contradiction.

It should be understood that the embodiments disclosed herein are illustrative and non-restrictive in every respect. The technical scope defined by the present disclosure is defined by the scope of the claims, rather than the description of the embodiments described above, and is intended to include any modifications within the scope and meaning equivalent to the scope of the claims.

REFERENCE SIGNS LIST

10: DC positive bus; 20: DC neutral point bus; 30: DC negative bus; 40, 40*u*, 40*v*, 40*w*: AC line; 50: three-level circuit; 50*u*: U-phase arm; 50*v*: V-phase arm; 50*w*: W-phase arm; 60: control circuit; 61: CPU; 62: RAM; 63: ROM; 64: I/F device; 65: storage device; 66: communication bus; 80: GPS; 81: altimeter, 82: calculator; 84: thermometer; 86: timer; 88: controller; 90: driver; 100, 200, 300: power conversion device; 101: DC power supply; 111, 112: capacitor; 180: motor; Q1 to Q6: semiconductor elements; S1 to S5, S11 to S13, S21, S22, S31, S32, S41 to S43, S51 to S54, S61 to S64: switching elements; D1 to D5, D11 to D13, D21, D22, D31, D32, D41 to D43, D51 to D54, D61 to D64: diodes; M1, M2: power module.

The invention claimed is:

1. A power conversion device provided between a DC positive bus, a DC negative bus and a DC neutral point bus, and an AC line, to perform power conversion between DC power and AC power, the power conversion device comprising:

a first semiconductor element having a first electrode connected to the DC positive bus;

a second semiconductor element having a first electrode connected to a second electrode of the first semiconductor element, and a second electrode connected to the DC neutral point bus;

a third semiconductor element having a first electrode connected to the DC neutral point bus;

a fourth semiconductor element having a first electrode connected to a second electrode of the third semiconductor element, and a second electrode connected to the DC negative bus;

a fifth semiconductor element having a first electrode connected to the first electrode of the second semiconductor element, and a second electrode connected to the AC line; and a sixth semiconductor element having a first electrode connected to the AC line, and a second electrode connected to a second electrode of the third semiconductor element, wherein each of the first to sixth semiconductor elements includes at least one semiconductor switching element, and at least one diode connected in anti-parallel with the at least one semiconductor switching element, respectively, a breakdown resistance of the first and fourth semiconductor elements to cosmic rays is higher than a breakdown resistance of the second and third semiconductor elements to cosmic rays, and a breakdown resistance of the fifth and sixth semiconductor elements to cosmic rays is higher than the breakdown resistance of the first and fourth semiconductor elements.

2. The power conversion device according to claim 1, wherein an insulation withstand voltage of the first and fourth semiconductor elements is higher than an insulation withstand voltage of the second and third semiconductor elements, and an insulation withstand voltage of the fifth and sixth semiconductor elements is higher than the insulation withstand voltage of the first and fourth semiconductor elements.

3. The power conversion device according to claim 1, wherein an element area of the first and fourth semiconductor elements is smaller than an element area of the second and third semiconductor elements, and an element area of the fifth and sixth semiconductor elements is smaller than the element area of the first and fourth semiconductor elements.

4. The power conversion device according to claim 1, wherein the at least one semiconductor switching element includes a plurality of semiconductor switching elements connected in parallel between a first electrode and a second electrode of each of the first and sixth semiconductor elements, the at least one diode includes a plurality of diodes connected in anti-parallel with the plurality of semiconductor switching elements, respectively, a number of semiconductor switching elements included in each of the first and fourth semiconductor elements is larger than a number of semiconductor switching elements included in each of the second and third semiconductor elements, and a number of semiconductor switching elements included in each of the fifth and sixth semiconductor elements is larger than the number of semiconductor switching elements included in each of the first and fourth semiconductor elements.

5. The power conversion device according to claim 4, further comprising:

a control circuit to control the power conversion by driving the first to sixth semiconductor elements; and a temperature detector to detect an element temperature of each of the first to sixth semiconductor elements while the power conversion is performed, wherein in each of the first to sixth semiconductor elements, the control circuit changes a number of semiconductor switching elements to be switched, of the plurality of semiconductor switching elements, in accordance with a detection value of the element temperature detected by the temperature detector.

6. The power conversion device according to claim 5, wherein, when the detection value of the element temperature is lower than a predetermined threshold temperature, the control circuit decreases the number of semiconductor switching elements to be switched, by stopping a portion of semiconductor switching elements being switched.

7. The power conversion device according to claim 4, further comprising:

a control circuit to control the power conversion by driving the first to sixth semiconductor elements; and a position detector to detect position information indicating an altitude, a latitude, and a longitude of the power conversion device, wherein in each of the first to sixth semiconductor elements, the control circuit changes a number of semiconductor switching elements to be switched, of the plurality of semiconductor switching elements, in accordance with the position information detected by the position detector.

8. The power conversion device according to claim 7, wherein the control circuit uses the position information to calculate a failure rate of the power conversion device due to the cosmic rays, and when the calculated failure rate is higher than a predetermined threshold, the control circuit increases the number of semiconductor switching elements to be switched, by starting a semiconductor switching element in a stopped state.

9. The power conversion device according to claim 6, wherein the control circuit changes a semiconductor switching element whose switching is to be stopped, at a predetermined cycle.

10. The power conversion device according to claim 4, further comprising:

a first semiconductor module; and a second semiconductor module, wherein the first semiconductor module includes the second and third semiconductor elements, and the second semiconductor module includes the fifth and sixth semiconductor elements.

11. The power conversion device according to claim 4, wherein the power conversion device is mounted in an aircraft, the power conversion device further comprises:

a control circuit to control the power conversion by driving the first to sixth semiconductor elements;

a temperature detector to detect an element temperature of each of the first to sixth semiconductor elements while the aircraft is flying; and a position detector to detect position information indicating an altitude, a latitude, and a longitude of the aircraft, while the aircraft is flying, the control circuit changes a number of semiconductor switching elements to be switched, of the plurality of semiconductor switching elements, in accordance with at least one of a detection value of the element temperature detected by the temperature detector and the position information detected by the position detector.

12. The power conversion device according to claim 8, wherein the control circuit changes a semiconductor switching element whose switching is to be stopped, at a predetermined cycle.

* * * * *